United States Patent
Terao

(10) Patent No.: US 8,024,116 B2
(45) Date of Patent: Sep. 20, 2011

(54) VEHICLE STRAY DETERMINATION APPARATUS AND DESTINATION GUIDE APPARATUS

(75) Inventor: Iichiro Terao, Kariya (JP)

(73) Assignee: Denso Corporation, Kariya (JP)

( * ) Notice: Subject to any disclaimer, the term of this patent is extended or adjusted under 35 U.S.C. 154(b) by 716 days.

(21) Appl. No.: 12/003,082

(22) Filed: Dec. 20, 2007

(65) Prior Publication Data

US 2008/0154497 A1   Jun. 26, 2008

(30) Foreign Application Priority Data

Dec. 25, 2006  (JP) .................................. 2006-348281

(51) Int. Cl.
G05D 1/06       (2006.01)
(52) U.S. Cl. ........ 701/210; 701/201; 701/202; 701/207; 701/209; 701/204; 340/988
(58) Field of Classification Search .......... 701/200–202, 701/207–216; 340/988–990, 995; 73/178 R
See application file for complete search history.

(56) References Cited

U.S. PATENT DOCUMENTS

| | | | | |
|---|---|---|---|---|
| 5,884,218 | A * | 3/1999 | Nimura et al. ............... | 701/209 |
| 5,906,654 | A * | 5/1999 | Sato ............... | 701/210 |
| 5,951,621 | A * | 9/1999 | Palalau et al. ............... | 340/995.2 |
| 6,064,323 | A * | 5/2000 | Ishii et al. ............... | 340/995.16 |
| 7,653,484 | B2 * | 1/2010 | Choi ............... | 701/210 |
| 2006/0224303 | A1 * | 10/2006 | Hayashi ............... | 701/201 |
| 2006/0267781 | A1 * | 11/2006 | Coulter ............... | 340/573.7 |
| 2008/0275636 | A1 * | 11/2008 | Hirose ............... | 701/201 |

FOREIGN PATENT DOCUMENTS

| | | | |
|---|---|---|---|
| JP | 05273913 A | * | 10/1993 |
| JP | A-05-273913 | | 10/1993 |
| JP | 07055488 A | * | 3/1995 |
| JP | A-07-055488 | | 3/1995 |
| JP | 2005069733 A | * | 3/2005 |
| JP | A-2005-69733 | | 3/2005 |
| JP | 2005209091 A | * | 8/2005 |

(Continued)

OTHER PUBLICATIONS

Office Action mailed Jul. 5, 2011 in the corresponding Japanese patent application No. 2006-348281 (English translation enclosed).

*Primary Examiner* — Jack Keith
*Assistant Examiner* — Adam Tissot
(74) *Attorney, Agent, or Firm* — Posz Law Group, PLC

(57) ABSTRACT

A vehicle stray determination apparatus in a vehicle includes a map database for designating a destination; an in-vehicle GPS unit for detecting a present position of the vehicle; a speed detector for detecting a speed of the vehicle; a parking signal input device for detecting an operation of a device such as a parking brake or hazard lamp switch used to stop or park the vehicle; and a control unit. When the present position of the vehicle is within a predetermined range from the destination, the control unit determines that the vehicle strays near the destination if (i) the speed of the vehicle is equal to or greater than a predetermined value or (ii) an operation of the parking brake or hazard lamp switch is not detected by the parking signal input device even if the speed is smaller than the predetermined value.

1 Claim, 11 Drawing Sheets

FOREIGN PATENT DOCUMENTS

| | | | |
|---|---|---|---|
| JP | A-2005-209091 | | 8/2005 |
| JP | 2005331470 A | * | 12/2005 |
| JP | A-2005-331470 | | 12/2005 |
| JP | 2006058026 A | * | 3/2006 |
| JP | 2006064672 A | * | 3/2006 |
| JP | A-2006-064672 | | 3/2006 |
| JP | A-2006-0580026 | | 3/2006 |

* cited by examiner

VEHICLE STRAY DETERMINATION APPARATUS AND DESTINATION GUIDE APPARATUS

CROSS REFERENCE TO RELATED APPLICATION

This application is based on and incorporates herein by reference Japanese Patent Application No. 2006-348281 filed on Dec. 25, 2006.

FIELD OF THE INVENTION

The present invention relates to a technology for determining a vehicle stray in a middle of a route to a destination.

BACKGROUND OF THE INVENTION

A conventional vehicular guide apparatus (or navigation apparatus) designates multiple destinations and notifies a user of the next destination when arriving at one of the destinations. The guide apparatus determines that the vehicle arrives at the destination if the vehicle approaches the destination; then, the driver is notified of the next destination (for example, refer to Patent document 1).

Patent document 1: JP-2006-64672 A

However, in spite of not having arrived at the destination, the guide apparatus sometimes determines that the vehicle arrives at the destination and notifies the next destination. For example, a destination may be a parking lot in a city. The parking lot may have a limited entrance. Although a destination guide is properly performed, the entrance to the parking lot (i.e., destination) may not be found. Thus, the vehicle may stray.

In such a case, the above guide apparatus determines that the vehicle arrives at the destination when approaching the position designated as the destination. Thus, although the vehicle strays actually, the next destination has been notified.

SUMMARY OF THE INVENTION

It is an object of the present invention to provide a technology which can guide a vehicle to multiple designated destinations one by one even if the vehicle strays near the destination.

According to a first example of the present invention, a vehicle stray determination apparatus for a vehicle is provided as follows. A map database storage unit is configured to store a map database including map information for designating a destination. A present position detector is configured to detect a present position of the vehicle. A speed detector configured to detect a speed of the vehicle. A parking signal detector is configured to detect an operation of a predetermined device for parking the vehicle. A stray determination unit is configured to determine, when a present position detected by the present position detector is within a predetermined range from a destination designated in the map database, a vehicle stray indicating the vehicle strays if one of two conditions (i) and (ii) is satisfied: (i) a speed of the vehicle detected by the speed detector is equal to or greater than a predetermined value; and (ii) an operation of the predetermined device for parking the vehicle is not detected by the parking signal detector even when the speed is smaller than the predetermined value.

According to a second example of the present invention, a vehicle stray determination apparatus for a vehicle is provided as follows. A map database storage unit is configured to store a map database including map information for designating a destination. A present position detector is configured to detect a present position of the vehicle. An orientation detector is configured to detect an orientation of the vehicle. A stray determination unit is configured to determine a vehicle stray indicating that the vehicle strays when an orientation of the vehicle detected by the orientation detector varies more than a predetermined angle if a present position detected by the present position detector is within a predetermined range from a destination designated in the map database.

According to a third example of the present invention, a vehicle stray determination apparatus for a vehicle is provided as follows. A map database storage unit is configured to store a map database including map information for designating a destination. A present position detector is configured to detect a present position of the vehicle. A stray determination unit is configured to determine a vehicle stray indicating that the vehicle strays if a present position detected by the present position detector passes more than one time through an identical position within a predetermined range from a destination designated in the map database within a predetermined time period.

According to a fourth example of the present invention, a vehicle stray determination apparatus for a vehicle is provided as follows. A map database storage unit is configured to store a map database including map information for designating a destination. A present position detector is configured to detect a present position of the vehicle. A stray determination unit is configured to determine a vehicle stray indicating that the vehicle strays if a characteristic expression is detected by the expression detector when a present position detected by the present position detector is within a predetermined range from a destination designated in the map database.

According to yet another example of the present invention, a destination guide apparatus for a vehicle is provided as follows. The destination guide apparatus includes the stray determination apparatus of any one of the above four examples, for instance, of the first example. Furthermore, in the destination guide apparatus, a destination designation unit is configured to designate multiple destinations in an order. A notification unit is configured to notify information on a guide to a destination designated by the destination designation unit. A destination guide unit is configured to calculate routes to the multiple destinations designated by the destination designation unit from a present position of the vehicle detected by the present position detector in the order, in which the multiple destinations are designated by the destination designation unit, and to provide the calculated routes to the notification unit. Herein, the destination guide unit determines that the vehicle arrives at one of the multiple destinations and calculates a route to a next destination of the multiple destinations when the stray determination apparatus does not determine that the vehicle strays near the one of the multiple destinations within the predetermined range from the one of the multiple destinations. In contrast, the destination guide unit does not determine that the vehicle arrives at the one of the multiple destinations and calculates the route to the next destination of the multiple destinations when the stray determination apparatus determines that the vehicle strays near the one of the multiple destinations within the predetermined range.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment (Configuration of Navigation Apparatus 1 for Vehicle)

As a first embodiment of the present invention, a navigation apparatus 1 (as a vehicular guide apparatus, destination guide apparatus, or vehicle stray determination apparatus) for a vehicle is explained with reference to FIGS. 1 to 4. The navigation apparatus 1 determines a vehicle stray indicating that the vehicle strays.

Figure 1:
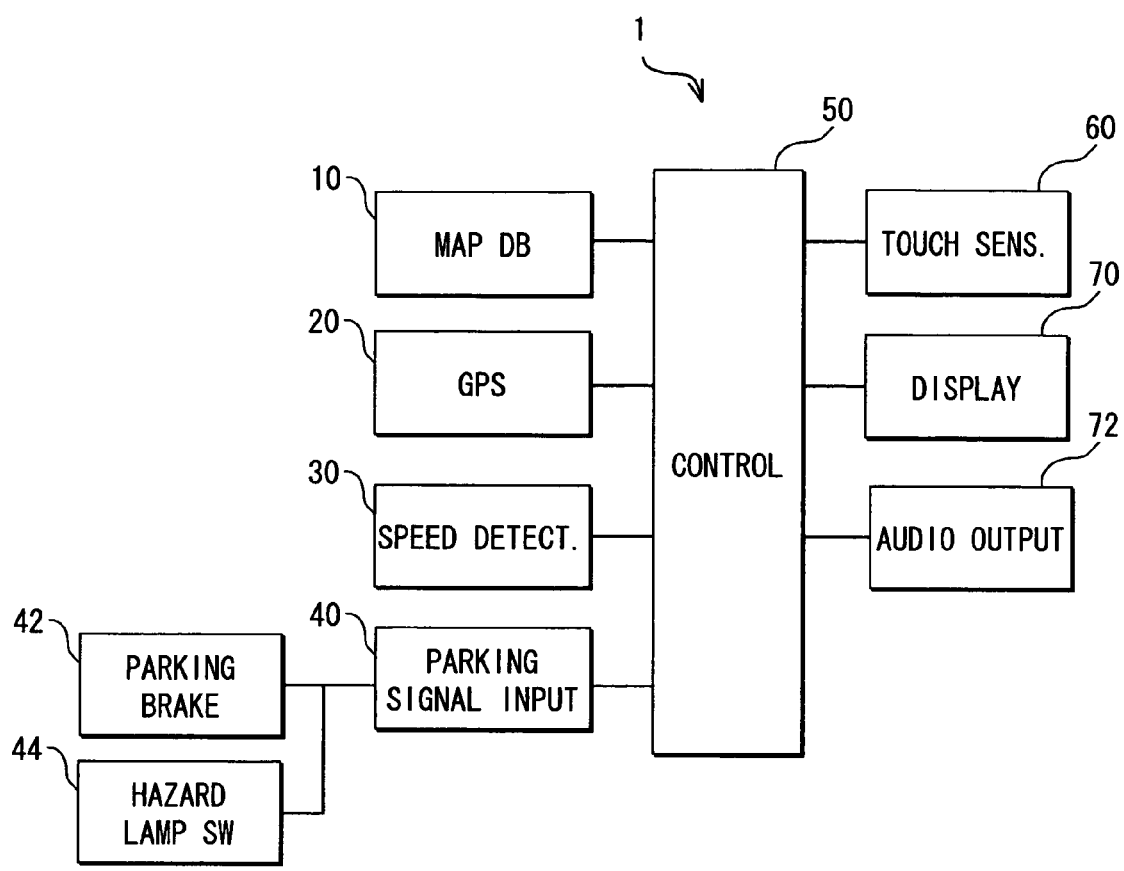
FIG. 1 is a block diagram illustrating a configuration of a navigation apparatus according to a first embodiment of the present invention.

FIG. 1 is a block diagram illustrating a configuration of the navigation apparatus 1. The navigation apparatus 1 includes a map database 10, an in-vehicle GPS (Global Positioning System) unit 20, a speed detector 30, a parking signal input device 40, a display device 70, an audio output device 72, and a touch sensor 60.

The map database 10 stores map information for designating a destination and is included in a large data volume storage device functioning as a map database storage means or unit such as a hard disk, a DVD-ROM, or a CD-ROM.

The in-vehicle GPS unit 20 is used for detecting a present position of the vehicle, and includes an antenna, a receiving unit, and a rate sensor to receive time information from GPS Satellites (not illustrated). The in-vehicle GPS unit 20 can function as a present position detecting means or detector to detect the present position of the vehicle based on the difference of the time information received from the four GPS Satellites and, if the time information cannot be received, detect the present position of the vehicle using the rate sensor.

The speed detector 30 detects a speed of the vehicle based on a rotational frequency per unit time of the axle (not illustrated). The parking signal input device 40 detects that a device for stopping or parking is operated in stopping or parking the vehicle. The device for stopping or parking includes a parking brake 42, a hazard lamp switch 44, for example.

The parking signal input device 40 can function as a parking signal detecting means or detector to detect that the device for stopping or parking is operated when a driver of the vehicle operates the device for stopping or parking. The device 40 outputs a detection signal to the control unit 50. For example, the detection signal is outputted to the control unit 50 if the vehicle stops and it is detected that the driver pulls the parking brake 42 up to a predetermined position. Moreover, the detection signal is outputted to the control unit 50 when it is detected that the hazard lamp switch 44 is pressed or operated.

The touch sensor 60 is provided in a display screen in the display device 70 and used for designating multiple destinations and an order to visit them. The touch sensor 60 is operated when a fingertip of such a driver approaches closely or contact. The sensor 60 is used for inputting the multiple destinations in order one by one according to display windows in the display device 70. The touch sensor 60 can thus function as an input means or unit used for inputting a demand.

Moreover, the touch sensor 60 is also used in order for the driver to input instructions of whether to end the destination guide. In such a case, a display window appears in the display device 70 for asking the driver about whether to end the destination guide. When the driver's finger approaches proximate or contacts the display window, the instruction of whether to end the destination guide is inputted The display device 70 and/or the audio output device 72 presents or notifies the information on the guide to the destination designated via the touch sensor 60. The display device 70 includes an LCD or CRT to display the information on the guide to the destination. The audio output device 72 includes an amplifier and speaker (non illustrated) to sound or announce the information on the guide to the destination. Thus, the display device 70 and the audio output device 72 can function as a notification means or unit.

The control unit 50 includes a CPU, ROM, RAM, or I/O (not illustrated) to execute the following processes (a) to (f):

(a) Routes are calculated from the present position of the vehicle detected by the in-vehicle GPS unit 20 to the destinations designated via the touch sensor 60 in the designated order, and then displayed in the display device 70, or sounded in the audio output device 72;

(b) When the present position of the vehicle detected by the in-vehicle GPS unit 20 is within a predetermined range from the destination designated in the map database 10, it is determined that the vehicle strays if the following either condition is satisfied: (i) the speed of the vehicle detected by the speed detector 30 is equal to or greater than a predetermined value; or (ii) an operation of the device for stopping or parking is not detected by the parking signal input device 40 even if the speed is smaller than the predetermined value;

(c) When the vehicle stray is not determined, it is determined that the vehicle arrives at the destination, and a route is calculated to reach the next destination; in contrast, when the vehicle stray is determined, it is not determined that the vehicle arrives at the destination, and a route is not calculated to reach the next destination;

(d) When the vehicle stray is determined, a notice to end the destination guide is displayed in the display device 70 or sounded in the audio output device 72, to the driver of the vehicle;

(e) When a demand to end the destination guide is then inputted via the touch sensor 60, the destination guide is ended; in contrast, when a demand not to end the destination designation is then inputted, it is not determined that the vehicle arrives at the destination; and (f) When only one destination is designated via the touch sensor 60, it is determined that the vehicle arrives at the destination even if the vehicle stray is determined.

Here, the control unit 50 can function as a stray determination means or unit, a destination designation means or unit, or a destination guide means or unit.

(Process by Control Unit 50)

Figure 2:
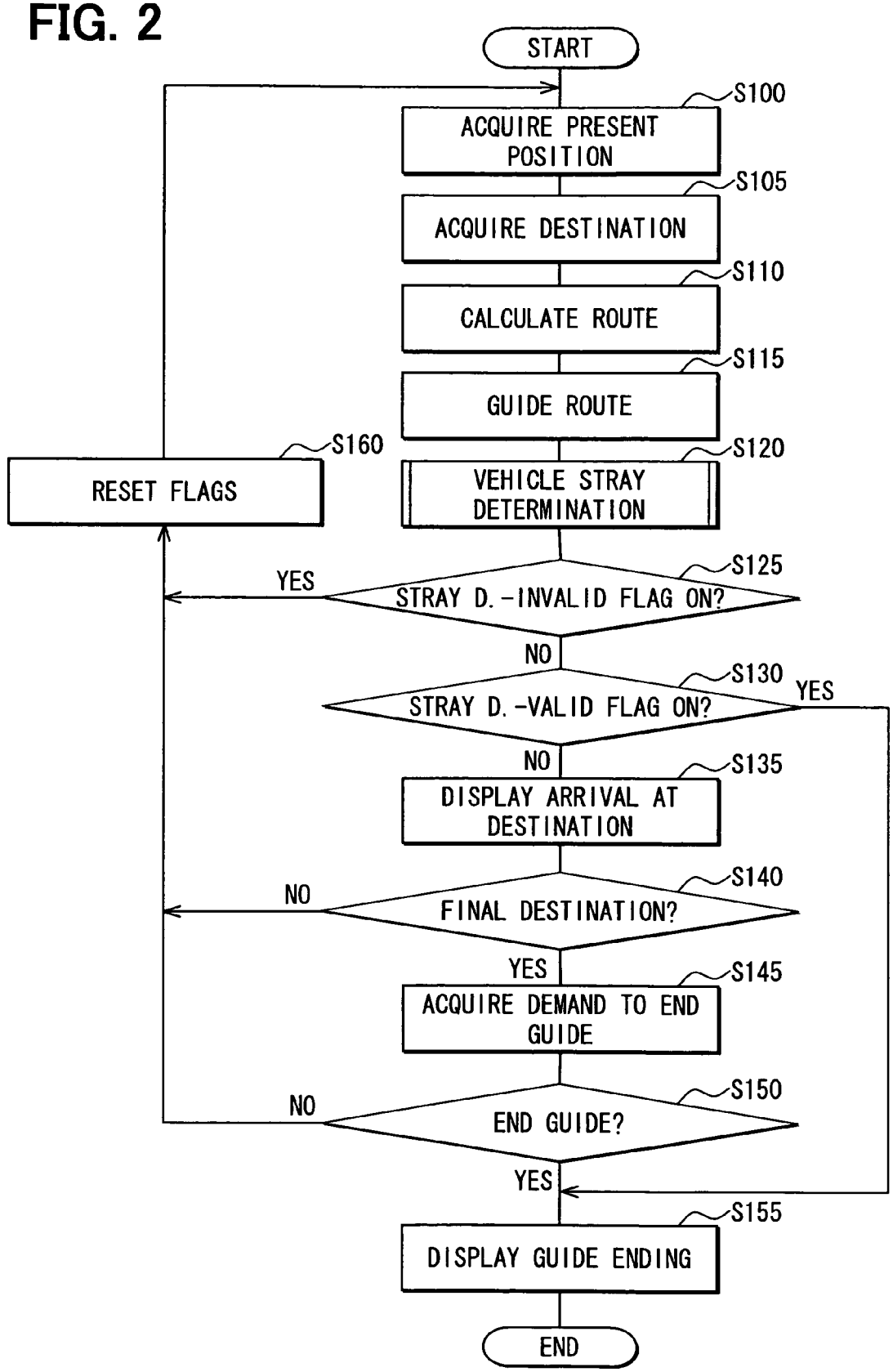
FIG. 2 is a flow chart indicating a process for a destination arrival determination according to the first embodiment.

Next, a determination process for destination arrival executed by the control unit 50 is explained with reference to FIG. 2. FIG. 2 is a flow chart indicating the process.

In the determination process for destination arrival, as illustrated in FIG. 2, the present position of the vehicle is acquired from the in-vehicle GPS unit 20 in S100, and the destination inputted and designated through the touch sensor 60 is acquired in S105. The destination first designated is acquired when multiple destinations are inputted and designated.

In S110, the route is calculated to the destination acquired in S105 from the present position of the vehicle acquired in S100. In S115, the route guide is executed based on the route to the destination calculated in S110.

In the route guide in S115, the map data is read from the map database 10, and then displayed as a map in the display device 70. Moreover, the present position of the vehicle is displayed on the map and the direction (or orientation) where the vehicle should run towards the destination is indicated as an arrow etc. At the intersection or the like, a turn direction etc. is sounded and notified via the audio output device 72.

In S120, the stray determination process is executed to determine whether the vehicle strays near the destination. The details of this stray determination process are mentioned later. In S125, it is determined whether the stray determination-invalid flag is ON. That is, it is determined whether a vehicle stray is determined in the stray determination process. When the stray determination-invalid flag is ON (S125:Yes) (i.e., the vehicle stray is not determined), the stray determination-invalid flag is reset in S160. The process then returns to S100, and the destination arrival determination process is repeated.

In contrast, when the stray determination-invalid flag is not ON (S125:No) (i.e., the vehicle stray is not determined), the process proceeds to S130. In S130, as the result of the stray determination process in S120, it is determined whether the stray determination-valid flag is ON (i.e., whether the vehicle stray is determined). When it is determined that the stray determination-valid flag is ON (S130:Yes), i.e., when the vehicle stray is determined, the process proceeds to S155.

In contrast, when it is determined that the stray determination-valid flag is not ON (S130:No), i.e., when the vehicle stray is not determined, a notice of having arrived at the destination is displayed in the display device 70 and sounded in the audio output device 72 in S135.

In S140, it is determined whether the destination which is presently reached is the final destination among the destinations designated via the touch sensor 60. When it is not the final destination (S140:No), the process proceeds to S160, where all the flags are reset. The process then proceeds to S100. The destination arrival determination process is repeated for the next destination.

When it is the final destination (S140:Yes), the process proceeds to S145. Here, information on whether a demand is inputted for ending the destination guide is obtained through the touch sensor 60.

In S150, it is determined whether the demand for ending the destination guide is inputted. When the demand is not inputted (S150:No), the process proceeds to S160, where all the flags are reset. The process then proceeds to S100. The destination arrival determination process is repeated.

When the demand is inputted (S150:Yes), the process proceeds to S155, where a notice of ending the destination guide is displayed in the display device 70 and sounded in the audio output device 72.

(Stray Determination Process)

Figure 3:
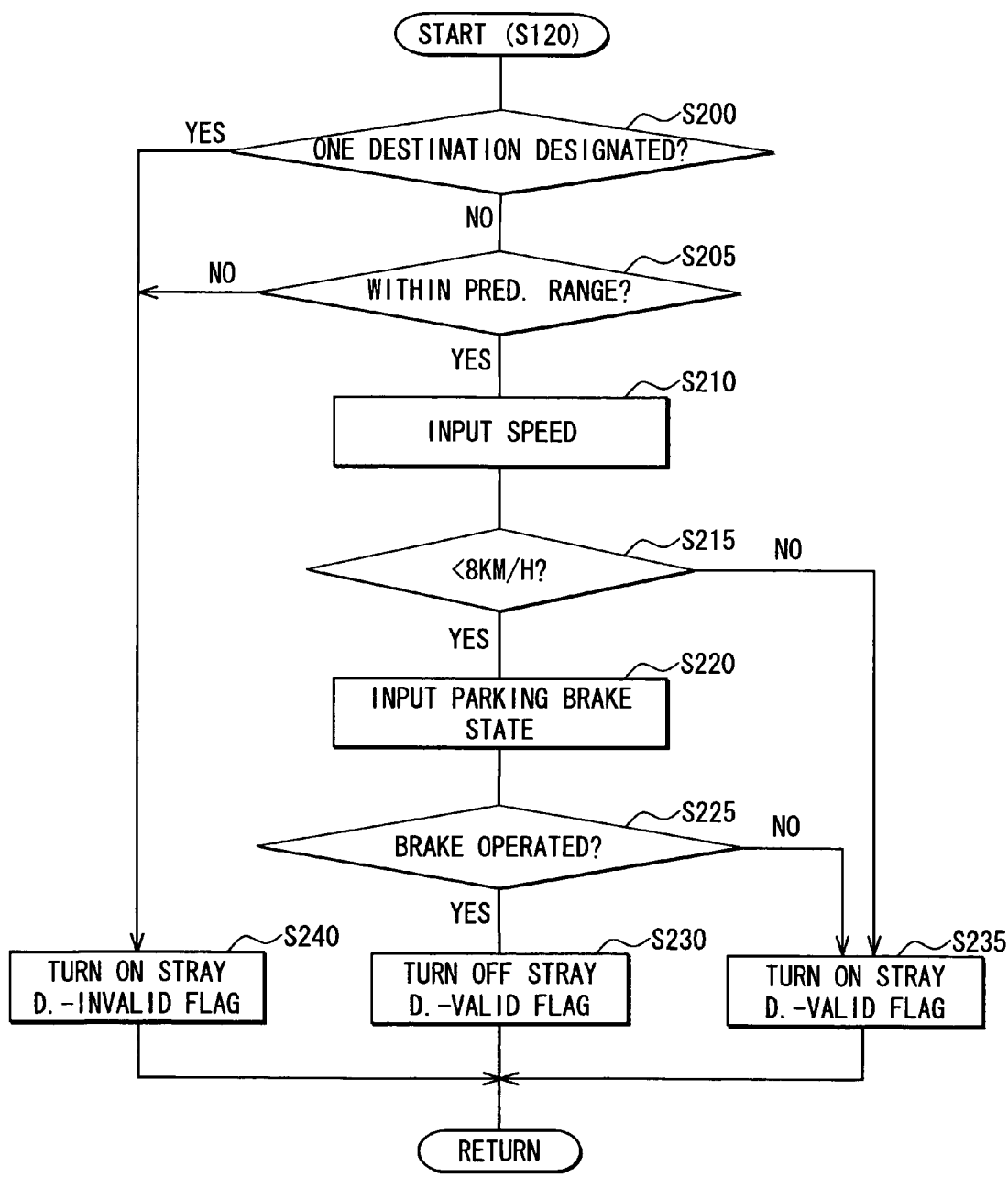
FIG. 3 is a flow chart indicating a process for a stray determination according to the first embodiment.

Next, the stray determination process is explained with reference to FIG. 3. The stray determination process illustrated in FIG. 3 is a subroutine of the destination arrival determination process.

In S200, it is determined whether the number of destination(s) designated via the touch sensor 60 is one. When the number of the destination(s) is one (S200:Yes), the process proceeds to S240, where the stray determination-invalid flag is set to ON. The process then ends. In contrast, when it is more than one (S200:No), the process proceeds to S205.

In S205, it is determined whether the present position of the vehicle is within a predetermined range from the destination designated. The present position is acquired in S100 in the destination arrival determination process (refer to FIG. 2) as the main routine.

When the present position is not within the predetermined range (S205:No), the process proceeds to S240, where the stray determination-invalid flag is set to ON. The process then ends. In contrast, when the present position is within the predetermined range (S205:Yes), the process proceeds to S210.

In S210, the speed of the vehicle is acquired from the speed detector 30. In S215, it is determined whether the vehicle speed is less than a predetermined value (e.g., 8 km/h). When the vehicle speed is not less than 8 km/h (S215:No), the process proceeds to S235, where the stray determination-valid flag is set to ON. The process then ends. In contrast, when the vehicle speed is less than 8 km/h (S215:Yes), the process proceeds to S220.

Further, the predetermined value of the vehicle speed may not be necessarily 8 km/h, but also slightly higher or lower than 8 km/h as long as the value indicates a slow speed. In S220, the state of the parking brake 42 is acquired from the parking signal input device 40. In S225, it is determined whether the parking brake 42 is operated (i.e., in the operating state).

When it is determined that the parking brake 42 is in the operating state (S225:Yes), the process proceeds to S230, where the stray determination-valid flag is set to OFF. The process then ends. In contrast, when it is determined that the parking brake 42 is not in the operating state (S225:No), the process proceeds to S235, where the stray determination-valid flag is set to ON. The process then ends.

(Characteristic of Navigation Apparatus 1 for Vehicle)

Figure 4:
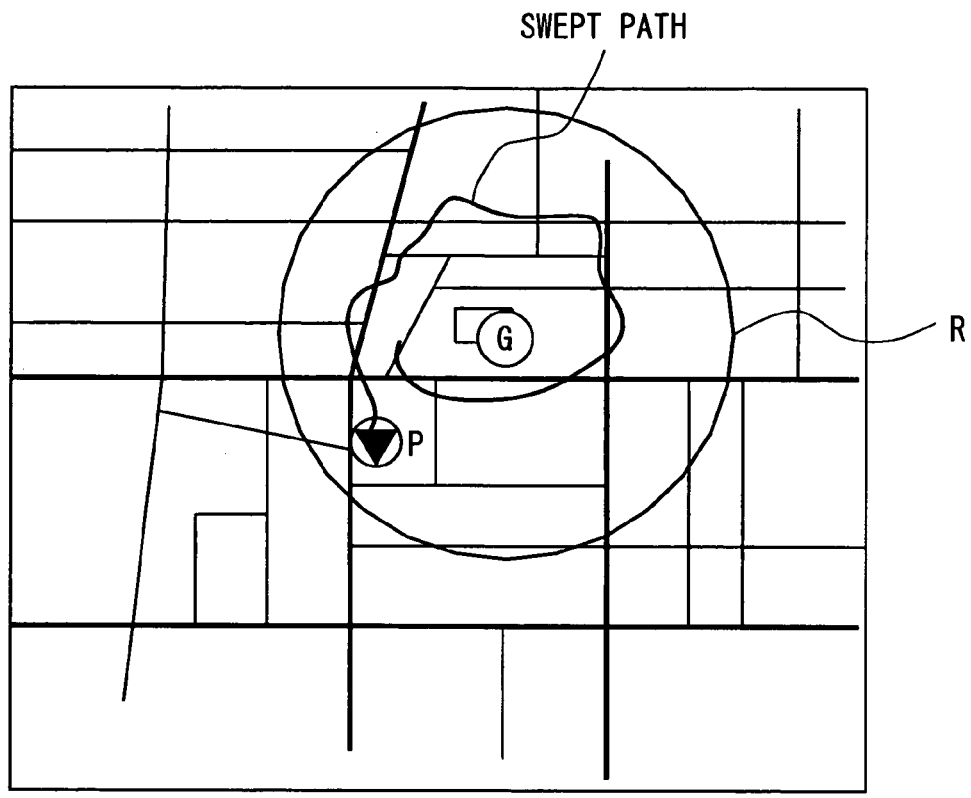
FIG. 4 is a diagram illustrating a state for a stray determination near a destination according to the first embodiment.

According to the above navigation apparatus 1, as illustrated in FIG. 4, it can be determined that the vehicle strays near the destination G (also see the swept path).

In other words, when the vehicle enters within the predetermined range R from the destination G, the vehicle should stop. However, in spite of having entered within the predetermined range R, the vehicle (i.e., present position P) may still run at a speed equal to or greater than a predetermined value (8 km/h). In such a case, it is supposed that the vehicle cannot stop because of a certain reason (i.e., the vehicle strays).

Moreover, even if the vehicle is within the predetermined range R from the destination G, the driver may not operate the device for stopping or parking the vehicle. In such a case, it is supposed that the driver keeps the vehicle ready for re-starting (i.e., the driver is not confident of the arrival to the destination G).

Therefore, when the present position of the vehicle is within the predetermined range from the destination, it is determined that the vehicle strays if the following either condition is satisfied: (i) the speed of the vehicle detected by the speed detector 30 is equal to or greater than the predetermined value; or (ii) an operation of the parking brake 42 or hazard lamp switch 44 is not detected by the parking signal input device 40 even if the speed is smaller than the predetermined value.

If the vehicle does not stray near the destination, the vehicle is determined to have arrived at the destination. The route to the next destination is then calculated. The calculated route is provided to the display device 70 and the audio output device 72 for notification.

In contrast, when the vehicle stray is determined, it is not determined that the vehicle arrives at the destination, and a route is not calculated to the next destination. The route to the next destination is not displayed in the display device 70 or is not sounded in the audio output device 72.

Thus, multiple destinations are designated in an order of visiting them in the destination guide apparatus. If the vehicle arrives at one destination without straying, the next destination is notified. In contrast, if the destination arrival is not determined while straying near the destination, the route guide to the next destination is not carried out.

Thus, this can avoid a misunderstanding that the route to the destination currently looked for is re-designated. This can provide a user with the navigation apparatus 1 as a vehicular guide apparatus easy to use.

Further, the touch sensor 60 is included to input a demand of whether the driver ends the destination guide. When the vehicle stray is determined, the control unit 50 outputs a notice to end the destination guide to the driver by displaying it in the display device 70 and sounding it in the audio output device 72.

When a demand to end the destination guide is then inputted via the touch sensor 60, the destination guide is ended; in contrast, when a demand not to end the destination guide is then inputted, it is not determined that the vehicle arrives at the destination.

Thus when the vehicle strays, the guide to the destination can be provided depending on the driver's preference or demand. This can provide a user with the navigation apparatus 1 as a vehicular guide apparatus easy to use.

Second Embodiment

As a second embodiment of the present invention, a navigation apparatus 2 (as a vehicular guide apparatus, a destination guide apparatus, or a stray determination apparatus) for a vehicle is explained which determines a vehicle stray indicating that the vehicle strays based on orientations of the vehicle with reference to FIGS. 5 to 8. In addition, the configuration of the navigation apparatus 2 in the second embodiment is similar with that of the navigation apparatus 1 in the first embodiment; therefore, the same reference numbers are given to the same components, for which explanation is omitted.

(Configuration of Navigation Apparatus 2 for Vehicle)

Figure 5:
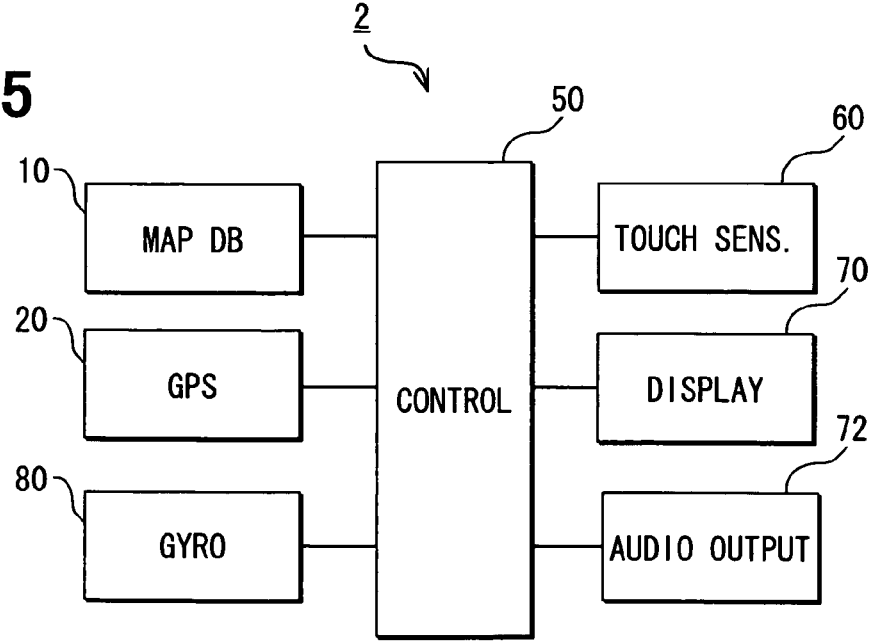
FIG. 5 is a block diagram illustrating a configuration of a navigation apparatus according to a second embodiment of the present invention.

FIG. 5 is a block diagram illustrating a configuration of the navigation apparatus 2. As illustrated in FIG. 5, the navigation apparatus 2 replaces the vehicle speed detector 30 and the parking signal input device 40 of the navigation apparatus 1 in FIG. 1 with a gyroscope 80.

(Process by Control Unit 50)

Figure 6:
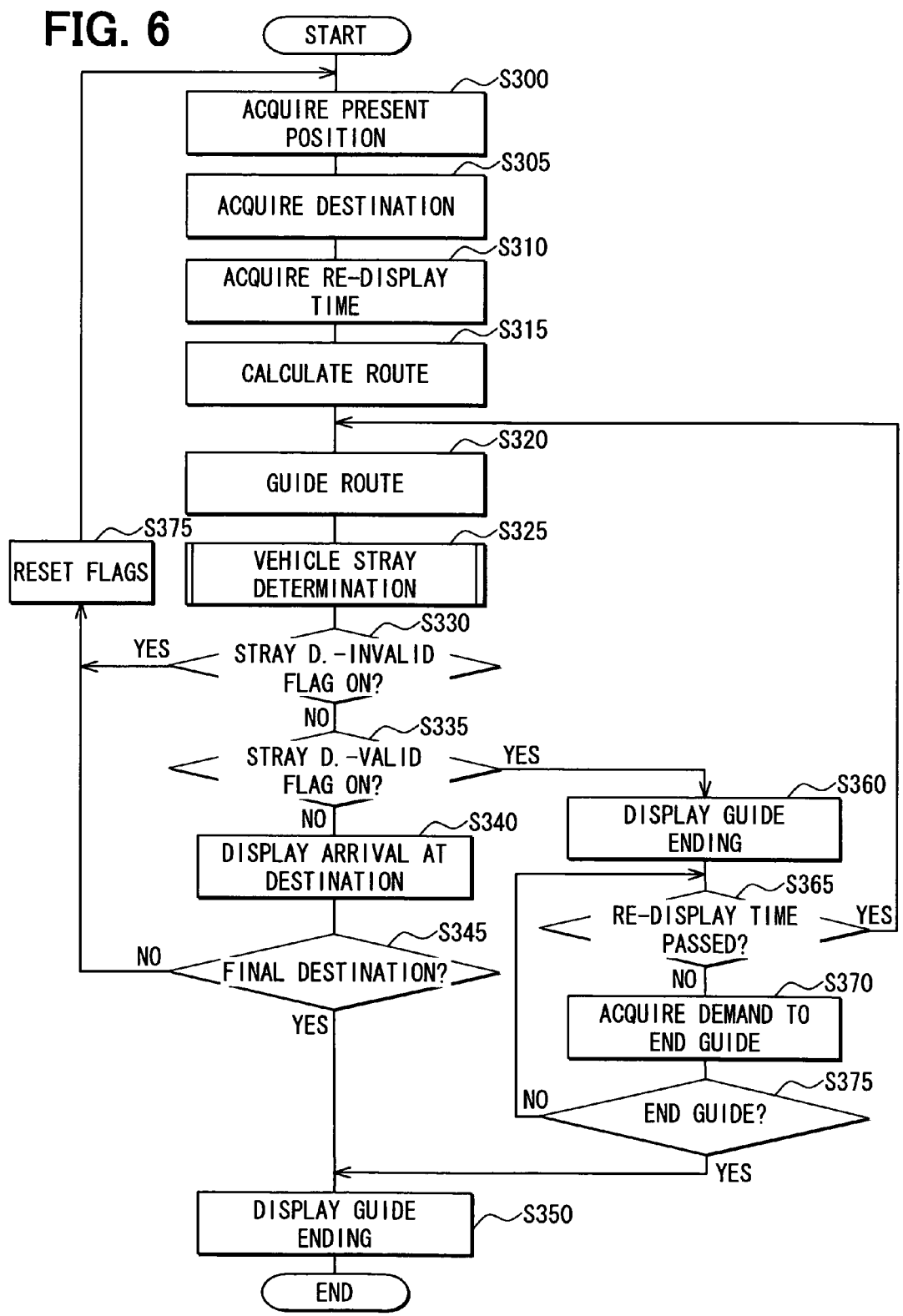
FIG. 6 is a flow chart indicating a process for a destination arrival determination according to the second embodiment.

In the control unit 50, the destination arrival determination process (refer to FIG. 2) in the first embodiment is replaced with a destination arrival determination process illustrated in FIG. 6. In the determination process for destination arrival, as illustrated in FIG. 6, the present position of the vehicle is acquired from the in-vehicle GPS unit 20 in S300, and the destination inputted and designated through the touch sensor 60 is acquired in S305.

In S310, a re-display time period inputted through the touch sensor 60 is acquired. When the vehicle strays near the destination, the route guide to the destination is once ended; then, the route guide to the destination is resumed after the re-display time period.

In S315, the route to the destination acquired in S305 from the present position of the vehicle acquired in S300 is calculated. In S320, the route guide is executed based on the route to the destination calculated in S315.

In S325, the stray determination process is executed to determine whether the vehicle strays near the destination. The details of the stray determination process are mentioned later. In S330, it is determined whether a stray determination-invalid flag is ON. That is, it is determined whether a vehicle stray is determined in the stray determination process. When the stray determination-invalid flag is ON (S330:Yes), i.e., the vehicle stray is not determined, the stray determination-invalid flag is then reset in S375. The process then returns to S300, and the destination arrival determination process is repeated.

In contrast, when the stray determination-invalid flag is not ON (S330:No), i.e., the vehicle stray is determined, the process proceeds to S335. In S335, as the result of the stray determination process in S325, it is determined whether the stray determination-valid flag is ON (i.e., whether the vehicle stray is determined). When it is determined that the stray determination-valid flag is ON (S335:Yes), i.e., when the vehicle strays, the process proceeds to S360.

In contrast, when it is determined that the stray determination-valid flag is not ON (S335:No), i.e., when the vehicle does not stray, a notice of having arrived at the destination is displayed in the display device 70 and sounded in the audio output device 72 in S340.

In S345, it is determined whether the destination presently reached is the final destination. When it is not determined that it is the final destination (S345:No), all the flags are reset in S375. The process then returns to S300, and the destination arrival determination process is repeated.

When it is determined that it is the final destination (S345:Yes), a notice of ending the destination guide is displayed in the display device 70 and sounded in the audio output device 72 in S350. The process then ends.

When it is not determined that the vehicle strays (S335:No), the process proceeds to S360, where a notice to end the destination guide is displayed in the display device 70 and sounded in the audio output device 72 in S360.

In S365, it is determined whether the re-display time period acquired in S310 passes. When it is determined that the re-display time period passes (S365:Yes), the process proceeds to S320 and the route guide is resumed.

In contrast, when it is determined that the re-display time period does not pass (S365:No), information on whether a demand is inputted for ending the destination guide is obtained through the touch sensor 60 in S370. In S375, it is determined whether the demand for ending the destination guide is inputted.

When it is not determined that the demand for ending the destination guide is inputted (S375:No), the process returns to S365. In contrast, when the demand is inputted (S375:Yes), the process proceeds to S350, where a notice of ending the destination guide is provided to the display device 70 and the audio output device 72. The process then ends.

(Stray Determination Process)

Next, the stray determination process is explained with reference to FIG. 7. The stray determination process is a subroutine of the destination determination process.

In S400, it is determined whether the number of destination(s) designated via the touch sensor 60 is one. When the number of the destination(s) is one (S400:Yes), the process proceeds to S465, where the stray determination-invalid flag is set to ON. The process then ends. In contrast, when it is more than one (S400:No), the process proceeds to S405.

In S405, it is determined whether the present position of the vehicle is within a predetermined range from the destination designated. The present position is acquired in S300 in the destination arrival determination process (refer to FIG. 6) as the main routine.

When the present position is not within the predetermined range (S405:No), the process proceeds to S465, where the stray determination-invalid flag is set to ON. The process then ends. In contrast, when the present position is within the predetermined range (S405:Yes), the process proceeds to S410, where a notice of approaching proximate the destination is displayed in the display device 70. In S415, a timer starts for counting time up to a time when a determination of arriving at the destination is executed. In S420, the orientation (i.e., orientation A) of the vehicle is acquired from the gyroscope 80 (which can function as an orientation detecting means or detector). In S425, the timer starts for counting time to compare the vehicle orientations.

In S430, it is determined whether a predetermined time period passes by using the timer starting in S425. If the predetermined time period does not pass, S430 is repeated until the predetermined time passes.

In S440, the orientation (i.e., orientation B) of the vehicle is acquired. In S445, it is determined whether the difference between the orientation B and orientation A acquired in S420 is equal to or less than 90 degrees.

When the difference between the orientation B and orientation A is determined to be equal to or less than 90 degrees (S445:Yes), the process proceeds to S450. When the difference between the orientation B and orientation A is determined to be not equal to or less than 90 degrees (S445:No), the process proceeds to S460, where the stray determination-valid flag is set to ON. The process then ends.

In S450, it is determined whether the counted time of the timer is within a predetermined time period. When it is within the predetermined time period (S450:Yes), the process returns to S420. The acquisition of vehicle orientations and the comparison are repeated. When the counted time of the timer is not within the predetermined time period (S450:No), the stray determination-valid flag is set to OFF in S455 and the process then ends.

(Characteristic of Navigation Apparatus 2 for Vehicle)

According to the above navigation apparatus 2, it can be determined that the vehicle strays near the destination.

That is, when the present position P of the vehicle is within a predetermined range from the destination G, the control unit 50 determines that the vehicle strays if the change of the orientation of the vehicle detected by the gyroscope 80 during traveling from Point A to Point B (see FIG. 8) is more than a predetermined angle (i.e., 90 degrees).

As explained above, the vehicle should stop when the vehicle enters within the predetermined range from the destination. Nevertheless, if the orientation of the vehicle varies equal to or greater than the predetermined angle (i.e., 90 degrees), it is supposed that the vehicle strays in a proximity to the destination.

Therefore, according to the navigation apparatus 2, it can be determined whether the vehicle strays. Further, it is possible to designate a time period from when the vehicle stray near a destination is determined to when a route to the destination is notified again. A notice for designating the time period can be performed by displaying using the display device 70 or sounding using the audio output device 72. Thus, the time period to notify the route again can be designated according to the driver's characteristics or preference. This can provide a user with the navigation apparatus 2 as a vehicular guide apparatus easy to use.

Moreover, when it is detected by the in-vehicle GPS unit 20 that the present position of the vehicle is separated from (i.e., outside of) the predetermined range, the control unit 50 does not notify the route to the destination via the display device 70 or the audio output device 72. A driver may change his/her mind and intend to go to another destination without approaching or reaching the designated destination. In such a case, the above configuration of the navigation apparatus 2 is convenient to the driver.

Third Embodiment

Next, another navigation apparatus is explained which determines a vehicle stray based on whether the vehicle passes through the same position near the destination. In the third embodiment, the configuration of the navigation apparatus 2 and the destination arrival determination process by the control unit 50 are the same as those in the second embodiment (see FIGS. 5, 6). Explanation for the configuration and the destination arrival determination process is omitted herein.

(Stray Determination Process)

Next, a stray determination process in the third embodiment is explained with reference to FIG. 9. The stray determination process is similar with that of the second embodiment (refer to FIG. 7); therefore, the same step is assigned with the same step number and is basically omitted from the explanation.

Figure 7:
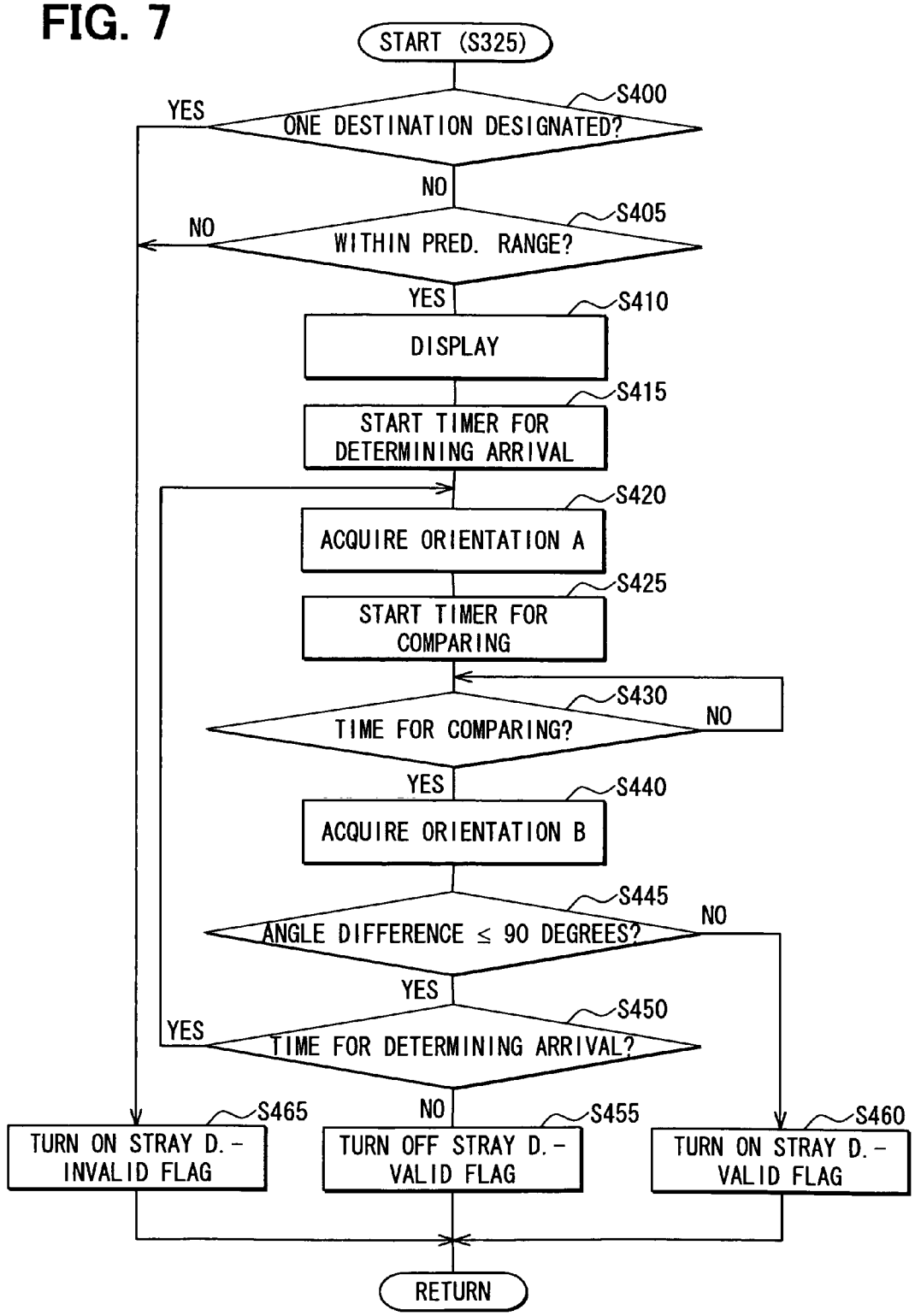
FIG. 7 is a flow chart indicating a process for a stray determination according to the second embodiment.
Figure 8:
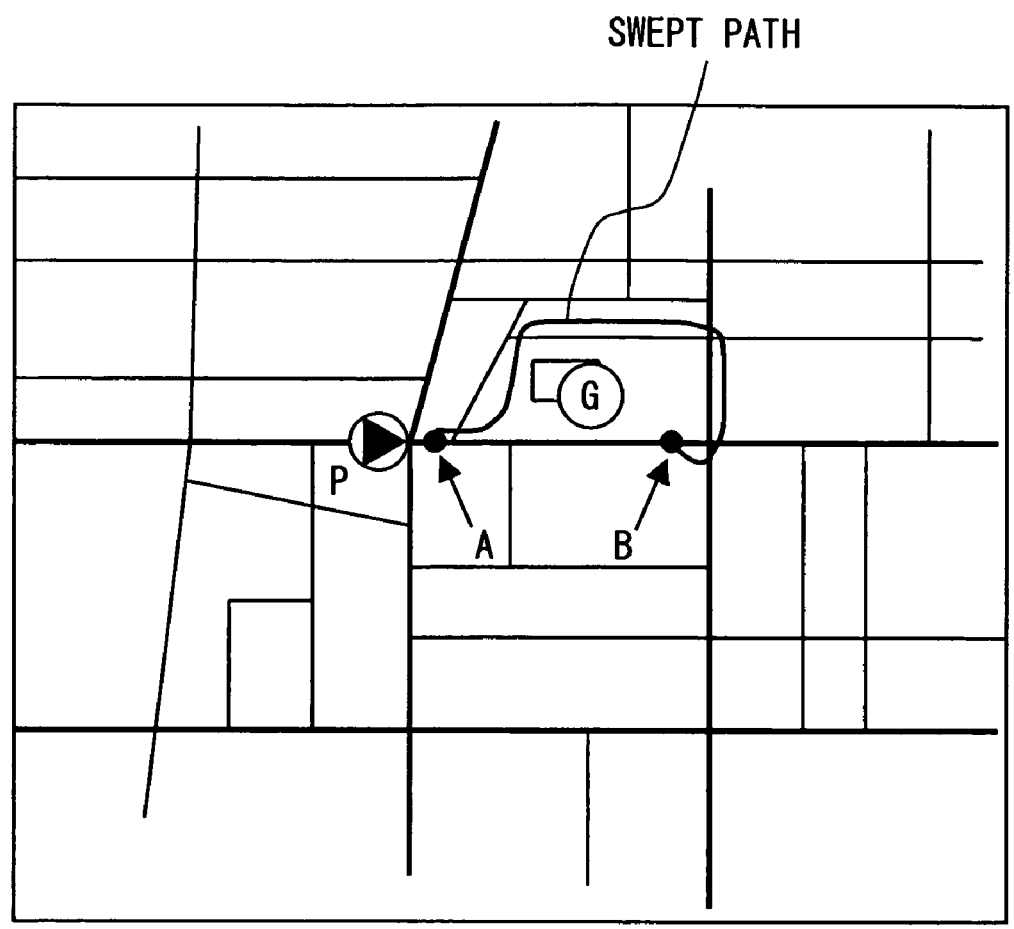
FIG. 8 is a diagram illustrating a state for a stray determination near a destination according to the second embodiment.
Figure 9:
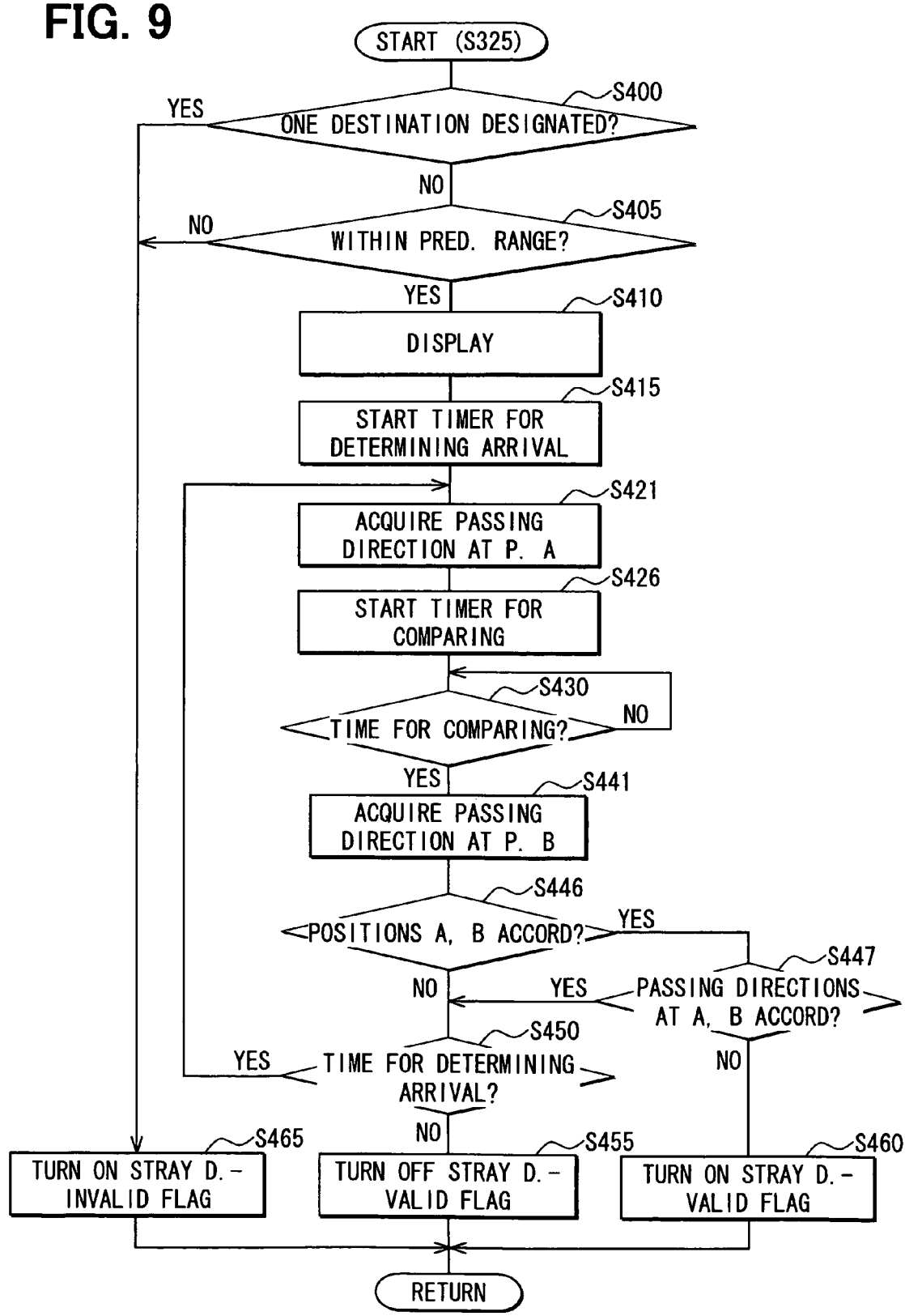
FIG. 9 is a flow chart indicating a process for a stray determination according to a third embodiment of the present invention.

In Step S421 in FIG. 9 of the stray determination process in the third embodiment, unlike Step S420 in FIG. 7 of the second embodiment, the orientation A of the vehicle is not acquired from the gyroscope 80. Instead, a present position A (vehicle position information A) of the vehicle is acquired from the in-vehicle GPS unit 20 and a passing direction in the acquired present position A is acquired from the gyroscope 80.

In S441, unlike in S440, the orientation (i.e., orientation B) of the vehicle is not acquired from the gyroscope 80. Instead, a present position B (vehicle position information B) of the vehicle is acquired from the in-vehicle GPS unit 20 and a passing direction in the acquired present position B is acquired from the gyroscope 80.

In S446, unlike in S445, the difference between the vehicle orientation A and B is not compared. Instead, it is determined whether the vehicle position information B acquired in S441 and the vehicle position information A acquired in S421 accord with each other.

When the vehicle position information A and the vehicle position information B do not accord (S446:No), the process proceeds to S450. S450 and subsequent steps are the same as those in the stray determination process of the second embodiment.

In contrast, when the vehicle position information A and the vehicle position information B accord (S446:Yes), the process proceeds to S447, which is not included in the second embodiment. In S447, it is determined whether the passing directions in the position A and position B accord with each other.

When the passing directions accord (S447:Yes), the process proceeds to S450. When the passing directions do not accord (S447:No), the process proceeds to S460, where the stray determination-valid flag is turned ON similarly in the second embodiment, and the process then ends.

(Characteristic)

Figure 10:
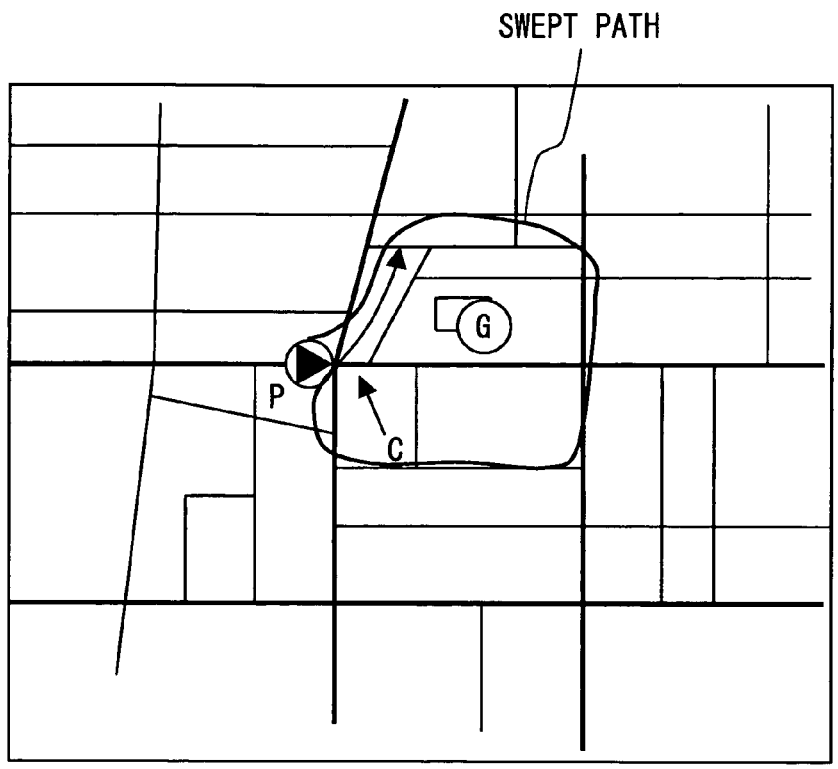
FIG. 10 is a diagram illustrating a state for a stray determination near a destination according to the third embodiment.

According to the above navigation apparatus 2, as illustrated in FIG. 10, it can be determined that the vehicle strays near the destination.

That is, directions in which the vehicle passes through the same position C within the predetermined range from the destination G can be detected within a predetermined time period; further, the frequency the vehicle passes through the same position C can be detected within the predetermined time period. Based on the detected directions and/or frequency, it can be determined whether the vehicle strays.

Fourth Embodiment

Next, a navigation apparatus 3 as a vehicular guide apparatus, a destination guide apparatus, or a stray determination apparatus is explained with reference to FIGS. 11, 12. The navigation apparatus 3 executes a stray determination based on motion changes in the body of a driver of the vehicle. The configuration of the navigation apparatus 3 in the fourth embodiment is similar with that of the navigation apparatus 2 in FIG. 5 of the second embodiment; therefore, the same reference numbers are given to the same components, for which explanation is omitted herein. Further, in the fourth embodiment, the destination arrival determination process by the control unit 50 is the same as that in the second embodiment (see FIG. 6). Explanation for the destination arrival determination process is thereby omitted herein.

(Configuration)

Figure 11:
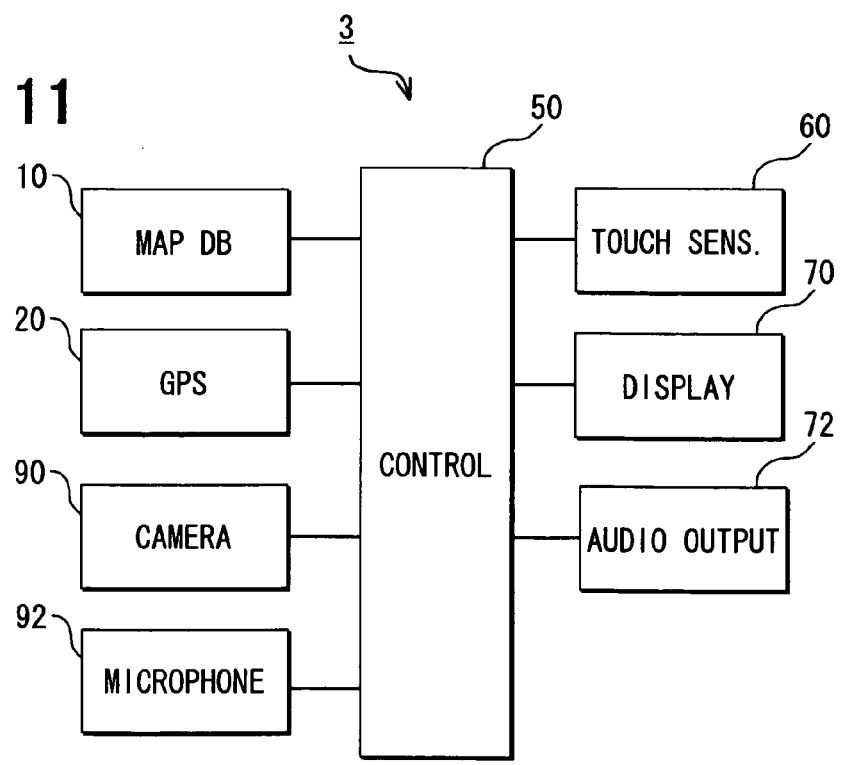
FIG. 11 is a block diagram illustrating a configuration of a navigation apparatus according to a fourth embodiment of the present invention.

FIG. 11 shows a block diagram for the configuration of the navigation apparatus 3. The navigation apparatus 3 includes a camera 90 and a microphone 92 in the passenger compartment, instead of the gyroscope 80 of the navigation apparatus 2 (refer to FIG. 5) of the second embodiment.

The camera 90 is attached in a front part of the passenger compartment to able to function as an image capture for capturing an image of a part of the driver's body. The microphone 92 is attached in a front part of the passenger compartment to acquire voices or speeches uttered by a driver. Thus, the camera 90 and microphone 92 can function as an expression detecting means or detector.

(Stray Determination Process)

Next, a stray determination process in the fourth embodiment is explained with reference to FIG. 12. The stray determination process is similar with that of the second embodiment (refer to FIG. 7); therefore, the same step is assigned with the same step number and is omitted from the explanation.

Figure 12:
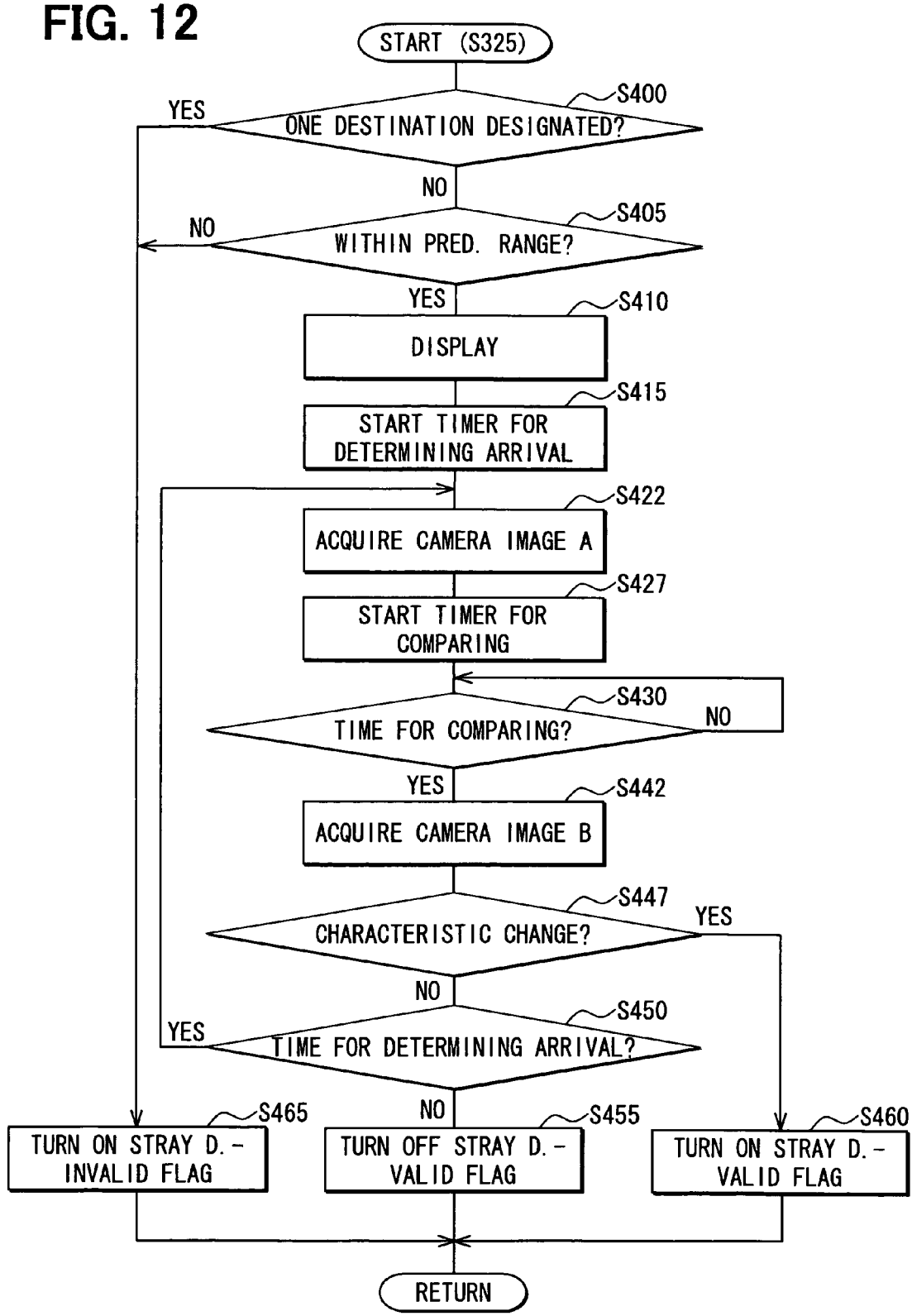
FIG. 12 is a flow chart indicating a process for a stray determination according to the fourth embodiment.

In Step S422 in FIG. 12 of the stray determination process in the fourth embodiment, unlike Step S420 in FIG. 7 of the second embodiment, the orientation A of the vehicle is not acquired from the gyroscope 80. Instead, a camera image A, i.e., an image of a body of the driver, is acquired from the camera 90.

In S427, a timer starts for counting time to compare the camera images. In S442, unlike in S440, the orientation (i.e., orientation B) of the vehicle is not acquired from the gyroscope 80. Instead, the camera image B is acquired from the camera 90.

In S447, unlike in S445, the difference between the vehicle orientation A and B is not compared. Instead, based on the difference between the camera image B acquired in S442 and the camera image A acquired in S422, it is determined whether the change of the motion of the driver's body is characteristic.

The characteristic change in order to visually recognize a destination or a landmark for finding the destination may be determined within the predetermined time period determined in S430. For instance, within the predetermined time period, the state of frequently moving the face right and left, i.e., eye roving may take place. Further, in the predetermined time period, the upper half of the body may greatly move right and left, or the upper half of the body may twist.

When it is not determined that the motion change of the body is characteristic based on the difference between the camera image A and camera image B (S447:No), the process proceeds to S450. S450 and subsequent steps are the same as those in the stray determination process of the second embodiment.

In contrast, when it is determined that the motion change of the body is characteristic based on the difference (S447:Yes), the process proceeds to S460. In S460, the stray determination-valid flag is set to ON similarly in the second embodiment, and the process then ends.

(Characteristic)

With the camera 90 in the passenger compartment, the driver's image is acquired and subjected to the image recognition of the driver's motion. It is possible to detect a characteristic change in the physical action or motion of the driver which is different from that expressed in a usual driving state. Thus the control unit 50 can determine whether the vehicle strays.

Fifth Embodiment

Next, a navigation apparatus 3 as a vehicular guide apparatus, a destination guide apparatus, or a stray determination apparatus is explained with reference to FIG. 13. The navigation apparatus 3 executes a stray determination based on voices uttered by a driver of the vehicle. In the fifth embodiment, the configuration of the navigation apparatus 3 is the same as that in the fourth embodiment (see FIG. 11). Further, the destination arrival determination process by the control unit 50 is the same as that in the second embodiment (see FIG. 6). Explanation for the configuration and the destination arrival determination process is therefore omitted herein.

(Stray Determination Process)

Next, a stray determination process in the fifth embodiment is explained with reference to FIG. 13. The stray determination process is similar with that of the fourth embodiment (refer to FIG. 11); therefore, the same step is assigned with the same step number and is omitted from the explanation.

Figure 13:
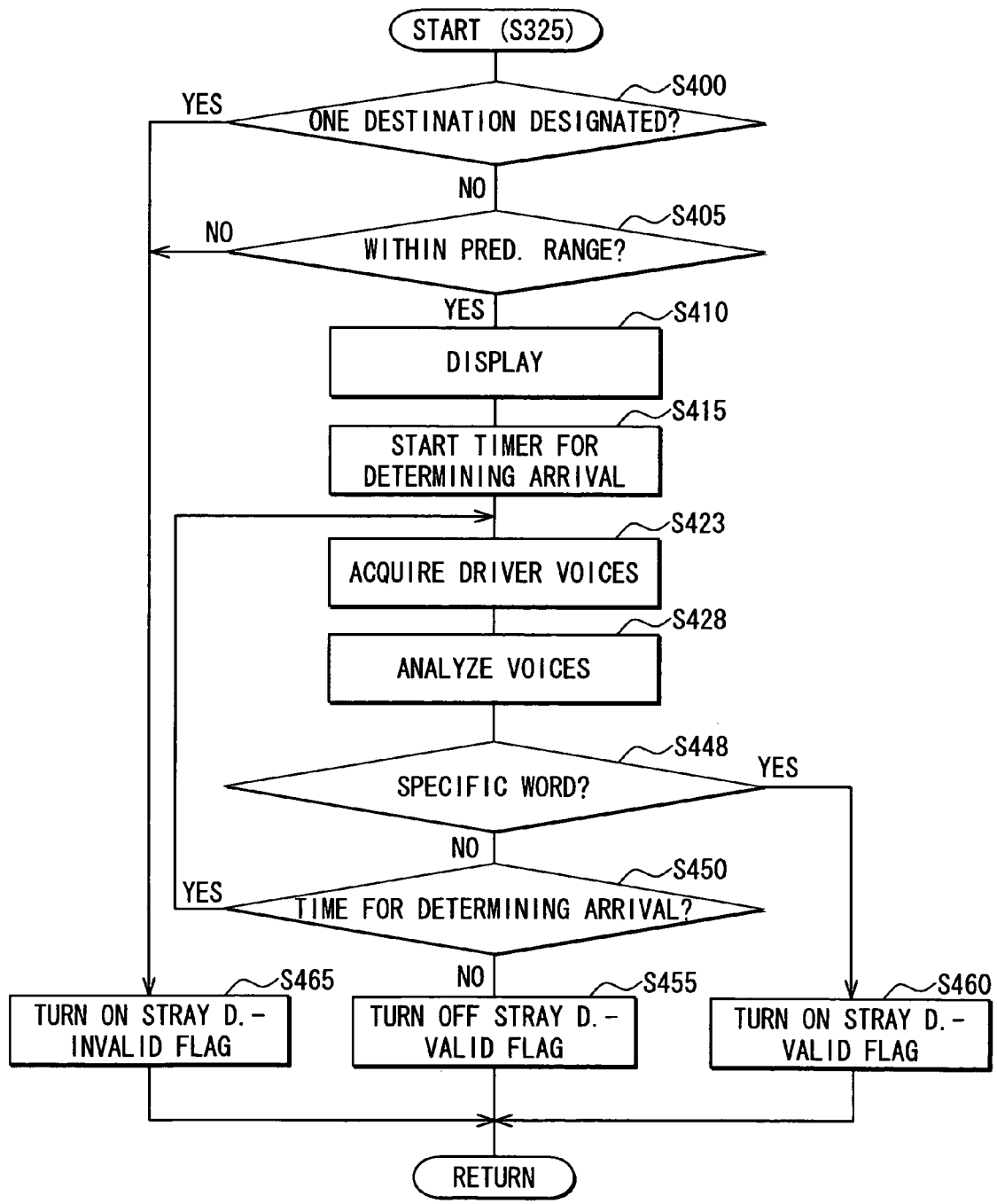
FIG. 13 is a flow chart indicating a process for a stray determination according to a fifth embodiment of the present invention.

In Step S423 in FIG. 13 of the stray determination process in the fifth embodiment, unlike Step S422 in FIG. 12 of the fourth embodiment, the camera image A is not acquired from the camera 90 in the passenger compartment. Instead, voices of the driver are acquired from the microphone 92.

In S428, unlike S427 in FIG. 12, a timer does not start for counting time to compare the camera images; instead, contents of the driver's voices acquired in S423 (i.e., what kind of speech the driver uttered) is analyzed by speech processing.

Unlike in the fourth embodiment, the counting the predetermined time period in S430 and the acquisition of the camera image B in S442 are deleted. In S448, it is determined whether the contents of the driver's voices analyzed in S428 includes a specific word or phrase (or language).

Here, "specific word or phrase" signifies a word or phrase, which is previously registered in the ROM of the control unit 50 and uttered by a driver when the vehicle strays, such as "oh" or "where?"

When the driver's voice does not include a specific word or phrase (S448:No), the process proceeds to S450. S450 and subsequent steps are the same as those in the stray determination process of the fourth embodiment.

In contrast, when the driver's voice includes a specific word or phrase (S448:Yes), the process proceeds to S460, where the stray determination-valid flag is set to ON similarly in the fourth embodiment, and the process then ends.

(Characteristic)

Thus, it can be determined that the vehicle strays by detecting, as the characteristic change of the expression (or physical action), a specific word or phrase (or language) included in the voices or speeches detected by the microphone 92.

Although the embodiments are described above, the present invention is not limited to the above embodiments and can be modified. For example, the notice or notification to a driver uses both the display device 70 and the audio output device 72; otherwise, the notice or the like may be performed via only either the display device 70 or the audio output device 72, independently.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer. Furthermore, the software unit or any combinations of multiple software units can be included in a software program, which can be contained in a computer-readable storage media or can be downloaded and installed in a computer via a communications network.

Aspects of the discloser described herein are set out in the following clauses.

As a first aspect, a vehicle stray determination apparatus for a vehicle is provided as follows. A map database storage unit is configured to store a map database including map information for designating a destination. A present position detector is configured to detect a present position of the vehicle. A speed detector configured to detect a speed of the vehicle. A parking signal detector is configured to detect an operation of a predetermined device for parking the vehicle. A stray determination unit is configured to determine, when a present position detected by the present position detector is within a predetermined range from a destination designated in the map database, a vehicle stray indicating the vehicle strays if one of two conditions (i) and (ii) is satisfied: (i) a speed of the vehicle detected by the speed detector is equal to or greater than a predetermined value; and (ii) an operation of the predetermined device for parking the vehicle is not detected by the parking signal detector even when the speed is smaller than the predetermined value.

Such a vehicle stray determination apparatus can determine that the vehicle strays near a destination although the vehicle reaches a proximity to the destination. An additional explanation is shown below.

"A predetermined range from a destination" is defined as a range, within which the vehicle is determined to reach the destination. Therefore, when the vehicle enters within the predetermined range from the destination, the vehicle should stop.

However, in spite of having entered within the predetermined range, the vehicle may run at a speed equal to or greater than a predetermined value. In such a case, it is supposed that the vehicle cannot stop because of a certain reason (i.e., the vehicle strays).

Moreover, even if the vehicle is within the predetermined range from the destination, the vehicle may run at a speed smaller than the predetermined value without operating a device used for stopping or parking the vehicle. In such a case, it is supposed that the driver keeps the vehicle ready for re-starting (i.e., the driver is not confident of the arrival to the destination).

Therefore, when the present position of the vehicle is within the predetermined range from the destination, it is determined that the vehicle strays if the following either condition is satisfied: (i) the speed of the vehicle is equal to or greater than a predetermined value; or (ii) an operation of a device used for stopping or parking the vehicle is not detected by the parking signal detector even if the speed is smaller than the predetermined value.

Here, a "device for parking the vehicle" includes a parking brake or a hazard lamp, for example.

As a second aspect, the vehicle stray determination apparatus can further include an orientation detector and another stray determination unit. The orientation detector is configured to detect an orientation of the vehicle. The another stray determination unit is configured to determine a vehicle stray indicating that the vehicle strays when an orientation of the vehicle detected by the orientation detector varies more than a predetermined angle if a present position detected by the present position detector is within a predetermined range from a destination designated in the map database.

As explained above, the vehicle should stop when the vehicle enters within the predetermined range from the destination. Nevertheless, if the orientation of the vehicle varies equal to or greater than a predetermined angle, it is supposed that the vehicle strays near the destination.

When the vehicle strays, the vehicle sometimes passes through the same position repeatedly within a comparatively short time period.

Thus, as a third aspect, the vehicle stray determination apparatus can further include still another stray determination unit that is configured to determine a vehicle stray indicating that the vehicle strays if a present position detected by the present position detector passes more than one time through an identical position within a predetermined range from a destination designated in the map database within a predetermined time period.

Therefore, it is detected how many times within a predetermined time period the vehicle passes through the same position within the predetermined range from the destination. Based on the detected frequency of passing through the same position, it can be determined whether the vehicle strays.

Moreover, the driver may be puzzled when the destination cannot be viewed or the entrance to the destination cannot be found in spite of coming proximate to the destination. In such a case, it is supposed that the driver expresses a characteristic change or the like in an action unlike in the usual driving state.

Thus, as a fourth aspect, the vehicle stray determination apparatus can further include yet still another stray determination unit that is configured to determine a vehicle stray indicating that the vehicle strays if a characteristic expression is detected by the expression detector when a present position detected by the present position detector is within a predetermined range from a destination designated in the map database.

The above configuration can detect the characteristic or change of the driver's expression including an action or physical motion exhibited when the vehicle strays near the destination to thereby puzzle the driver. It can be thus determined that the vehicle strays based on the detected characteristic expression of the driver.

When the vehicle strays, a specific word, phrase, or language may be included in speeches or voices sounded or uttered as characteristic expression of the driver, for example, "oh!" or "where?"

Thus, in the vehicle stray determination apparatus, the expression detector may detect as the characteristic expression a specific word or phrase provided by the driver when the vehicle strays.

Thus, it can be determined that the vehicle strays by detecting, as the characteristic expression, a specific word or phrase detected by the expression detector. Moreover, a face and a body part may exhibit a physical motion different from that in a usual driving state as a characteristic or change of the driver's expression within a predetermined time period when the vehicle strays. For example, in order to visually recognize a destination or a landmark to locate the destination, the driver may move the face to right and left (i.e., roving), move the upper half body greatly to right and left, or twist the upper half body.

Thus, in the vehicle stray determination apparatus, the expression detector may include an image capture unit for capturing an image of a face or a body part of the driver. The expression detector may thereby detect the characteristic expression provided by the driver by recognizing a specific action different from an action expressed by the driver in a usual driving state based on an image of the driver's face or body part captured by the image capture unit.

In contrast, there is a case that a vehicle stray should not determined immediately after the vehicle enters within the predetermined range. For example, when the destination is a parking lot, the driver may perform a backward operation or cutback operation as a usual operation for parking the vehicle. It is necessary to avoid determining that the vehicle strays even in such a usual operation taking place in such a parking lot.

Thus, in the vehicle stray determination apparatus, the stray determination unit may be configured to designate a time period from when the vehicle enters within the predetermined range from the destination to when a vehicle stray is determined.

Thereby, the stray determination is not executed until a designated time period elapses from when the vehicle enters within the predetermined range. This helps prevent even a normal operation, e.g., for parking the vehicle, from mistakenly causing the vehicle stray determination. This can provide a user with a vehicle stray determination apparatus easy to use.

As another aspect, a destination guide apparatus for a vehicle is provided as follows. The destination guide apparatus includes the stray determination apparatus of any one of the above four aspects, for instance, of the first aspect. Furthermore, in the destination guide apparatus, a destination designation unit is configured to designate multiple destinations in an order. A notification unit is configured to notify information on a guide to a destination designated by the destination designation unit. A destination guide unit is configured to calculate routes to the multiple destinations designated by the destination designation unit from a present position of the vehicle detected by the present position detector in the order, in which the multiple destinations are designated by the destination designation unit, and to provide the calculated routes to the notification unit. Herein, the destination guide unit determines that the vehicle arrives at one of the multiple destinations and calculates a route to a next destination of the multiple destinations when the stray determination apparatus does not determine that the vehicle strays near the one of the multiple destinations within the predetermined range from the one of the multiple destinations. In contrast, the destination guide unit does not determine that the vehicle arrives at the one of the multiple destinstions and calculates the route to the next destination of the multiple destinations when the stray determination apparatus determines that the vehicle strays near the one of the multiple destinations within the predetermined range.

Under the above configuration of the destination guide apparatus, if the vehicle does not stray, the vehicle is determined to have arrived at the destination. The route to the next destination is then calculated and provided to the notification unit. In contrast, if the vehicle strays, the vehicle is determined not to have arrived at the destination. The route to the next destination is not then calculated. Thus, no route to the next destination is provided to the notification unit.

Multiple destinations may be designated in an order of visiting them in such a destination guide apparatus. In such a case, the next destination may be notified if the vehicle arrives at one destination without straying. In contrast, the arrival at the destination is not determined while the vehicle strays near the destination; therefore, the route guide to the next destination is not carried out.

Thus, this can avoid a misunderstanding that the route to the destination currently looked for is re-designated. This can provide a user with a destination guide apparatus easy to use.

Furthermore, when it is determined that the vehicle strays near one of the destinations, it may be not determined that the vehicle arrives at the one of the destinations. Further, the route to the one of the destinations may be notified again via the notification unit. This can provide the destination guide apparatus easy to use.

Here, "the one of the destinations" means the destination to which the vehicle is guided before determining the vehicle stray. Furthermore, when the vehicle reaches near the destination, some drivers are going to check the destination visually convincingly by themselves, and some drives are not going to check the destination visually at all. It may be preferable to designate a time period a time period from when determining that the vehicle strays near the one of the multiple destinations to when providing again the route to the one of the multiple destinations to the notification unit. Thus, the time period can be designated according to the driver's characteristics or preference. This can provide a user with a destination guide apparatus easy to use.

Moreover, the driver may change his/her mind and give up reaching the destination while straying. Thus, the destination guide unit may not provide again the route to the one of the multiple destinations to the notification unit when the present position detector included in the stray determination unit detects that the present position of the vehicle exits from within the predetermined range from the one of the multiple destinations.

By the way, when the vehicle strays, the driver may not want the notification unit to notify the guide or route to the destination. Thus, an input unit may be configured to be used for inputting a demand of whether to end a destination guide which guides the vehicle along the calculated route. In such a case, the destination guide unit may cause the notification unit to notify information indicating that the destination guide is to be ended when the stray determination apparatus determines that the vehicle strays near the one of the multiple destinations. Thereafter, the destination guide unit may end the destination guide when a demand to end the destination guide is inputted via the input unit while the destination guide unit may not determine that the vehicle arrives at the one of the multiple destinations when a demand not to end the destination guide is inputted via the input unit.

Thus when the vehicle strays, the guide to the destination can be provided depending on the driver's preference. This can provide a user with a destination guide apparatus easy to use.

By the way, when only one destination is designated, the next destination does not exist. Therefore, when it arrives at the one destination, it is not necessary to execute the guide to the next destination. Thus, when the destination designation unit designates only one destination instead of the multiple destinations, the destination guide unit may determine that the vehicle arrives at the only one destination even if the stray determination unit determines that the vehicle strays near the only one destination.

Thus, the driver understands that there are no destinations other than the presently designated destination. This helps prevent misunderstanding or doubt unnecessary for the driver.

It will be obvious to those skilled in the art that various changes may be made in the above-described embodiments of the present invention. However, the scope of the present invention should be determined by the following claims.

What is claimed is:

1. A vehicle stray determination apparatus for a vehicle, the apparatus comprising:
    a map database storage unit configured to store a map database including map information for designating a destination;
    a present position detector configured to detect a present position of the vehicle; and
    a destination stray determination unit, the destination stray determination unit being configured to determine a destination stray indicating that the vehicle is unable to reach the destination and strays near the destination, when a present position detected by the present position detector passes more than one time through an identical position within a predetermined range from a destination designated in the map database within a predetermined time period so as to have a swept path surrounding the destination.

* * * * *